(12) United States Patent
Pawlow et al.

(10) Patent No.: US 12,577,130 B2
(45) Date of Patent: Mar. 17, 2026

(54) DRINKING WATER DISPENSER WITH ULTRAVIOLET DISINFECTION DEVICE

(71) Applicant: Scandinavian Innovation Group Oy, Pomarkku (FI)

(72) Inventors: Andrzej Pawlow, Riga (LV); Arturs Pavlovs, Riga (LV)

(73) Assignee: Scandinavian Innovation Group Oy, Pomarkku (FI)

( * ) Notice: Subject to any disclaimer, the term of this patent is extended or adjusted under 35 U.S.C. 154(b) by 366 days.

(21) Appl. No.: 18/564,014

(22) PCT Filed: May 25, 2021

(86) PCT No.: PCT/IB2021/054526
§ 371 (c)(1),
(2) Date: Nov. 24, 2023

(87) PCT Pub. No.: WO2022/248909
PCT Pub. Date: Dec. 1, 2022

(65) Prior Publication Data
US 2024/0239691 A1 Jul. 18, 2024

(51) Int. Cl.
*C02F 1/32* (2023.01)
*B67D 3/00* (2006.01)

(52) U.S. Cl.
CPC ............ *C02F 1/325* (2013.01); *B67D 3/0093* (2013.01); *B67D 2210/00015* (2013.01); *C02F 2201/3222* (2013.01); *C02F 2201/3228* (2013.01); *C02F 2307/10* (2013.01)

(58) Field of Classification Search
None
See application file for complete search history.

(56) References Cited

U.S. PATENT DOCUMENTS

| | | | |
|---|---|---|---|
| 6,139,726 A | 10/2000 | Greene | |
| 6,483,119 B1 | 11/2002 | Baus | |
| 2016/0278424 A1 | 9/2016 | Liao et al. | |

FOREIGN PATENT DOCUMENTS

| | | | | |
|---|---|---|---|---|
| CN | 110272088 A | * | 9/2019 | ............. C02F 1/001 |
| JP | 2006062720 A | | 3/2006 | |
| JP | 2010052772 A | | 3/2010 | |
| JP | 2020044515 A | | 3/2020 | |
| WO | 2010117097 A1 | | 10/2010 | |

* cited by examiner

*Primary Examiner* — Krishnan S Menon
(74) *Attorney, Agent, or Firm* — Smartpat PLC

(57) ABSTRACT

A drinking water dispenser includes a body, including: an inlet pipe for connecting the external water source, a cold water tank having a lower part filled with water and an upper part in which an air cavity is formed, when the tank is filled with water, a water inlet connected to the inlet pipe, and water outlet connected to an outlet pipe, an outlet valve for dispensing water to consumers, connected to the outlet pipe, and a UV radiation source installed in the cold water tank. The water inlet is made in a form of a vertical pipe, placed in the cold water tank, and having an open upper end and a lower end connected to the inlet pipe; and the UV radiation source is installed in the upper part of the cold water tank above the open upper end of the vertical pipe of the water inlet.

10 Claims, 3 Drawing Sheets

DRINKING WATER DISPENSER WITH ULTRAVIOLET DISINFECTION DEVICE

CROSS-REFERENCE TO RELATED APPLICATION

This application is a national stage application, filed under 35 U.S.C. § 371, of International Patent Application PCT/IB2021/054526, filed on May 25, 2021.

TECHNICAL FIELD

The invention relates to drinking water dispensers, in particular, to dispensers equipped with an ultraviolet (UV) disinfection device.

BACKGROUND

There is a drinking water dispenser described in U.S. Pat. No. 6,483,119B1 containing a water storage tank equipped with a cooling device, a bottle receiver for installing an inverted bottle, and a UV radiation source placed in a waterproof case and installed in the storage tank for irradiating water in the storage tank. The disadvantage of such device is low efficiency of water UV radiation treatment. The storage tank can contain several litres of water, and efficient treatment of such volume of water requires a sufficient UV radiation power, and when even a small additional amount of water enters the storage tank, the entire volume of water must be re-treated.

U.S. Pat. No. 6,139,726A describes a treated water dispensing system containing a water storage tank equipped with a cooling device, a water supply inlet to the storage tank from an external water supply, and a UV lamp installed vertically in the storage tank to emit in top and bottom parts of the storage tank. In this case, water supply inlet is installed for water from the inlet to come to the upper part of the lamp and flow into the tank over the lamp surface.

The disadvantage of this device is decrease in lamp's UV radiation efficiency over the time due to the deposition of mineral substances contained in the water on the surface of the lamp, which requires periodical cleaning of the lamp.

Another disadvantage of this device is presence of places in the water tank where the lamp radiation does not come due to the shading of these places by structural elements.

SUMMARY

An objective of the disclosure is to improve the efficiency of disinfection and ease of use of a water dispenser. Another objective is to ensure the disinfection of the water coming to the storage tank and maintain the purity of the water in the storage tank. Another objective is to maintain the microbiological cleanliness of the airspace in the storage tank.

The technical result is achieved in drinking water dispenser comprising a body and installed in the body:
an inlet pipe for connecting an external water source,
a cold water tank equipped with a cooling device and having a lower part filled with water and an upper part in which an air cavity is formed, when the cold water tank is filled with water,
a water inlet connected to the inlet pipe, and
a water outlet connected to an outlet pipe,
an outlet valve for dispensing water to consumers, connected to the outlet pipe, and
a UV radiation source installed in the cold water tank. The water inlet is made in a form of a vertical pipe, placed in the cold water tank, and having an open upper end and a lower end connected to the inlet pipe; and the UV source is installed in the upper part of the cold water tank above the open upper end of the vertical pipe of the water inlet.

Such water supply into the cold tank guarantees that all water entering the cold tank is treated with UV radiation and excludes the possibility of untreated water entering the tank from an external source, as well as allows to threat with UV radiation both water and air containing in the cold tank, maintaining the microbiological purity inside the cold tank.

It is desirable that the open upper end of the vertical pipe is located close to the surface of water in the cold water tank. Preferably, at a distance of no more than 20 mm from the surface of water. Such placement of the open end of the vertical pipe allows to ensure that the water entering the tank is remaining near the surface where the effect of the UV radiation source is maximal.

The diameter of the vertical pipe is preferably in the range of 10 to 50 mm. Such a pipe turns out to be wide enough so that the UV radiation source can fully illuminate the inside of the pipe.

It is convenient to use one or more LEDs as a source of UV radiation. When using several LEDs as a source of UV radiation, they can be arranged so that some of the LEDs illuminate the inside of the pipe, and the rest illuminate the inside of the cold water tank.

In order to increase the efficiency of using the radiation of the UV sources, the inner surface of the vertical pipe is preferably made to reflect UV radiation well.

Preferably, the dispenser contains a control device, and an inlet valve regulating the water supply to the cold water tank and a water level sensor located in the cold water tank connected thereto, and the control device is configured to maintain the water level in the cold water tank between the specified upper and lower values. It is desirable that the specified upper value of water level is above the open end of the vertical water inlet pipe, and the specified lower value of water level is not lower than the open upper end of the vertical water inlet pipe.

DETAILED DESCRIPTION

Figure 1:
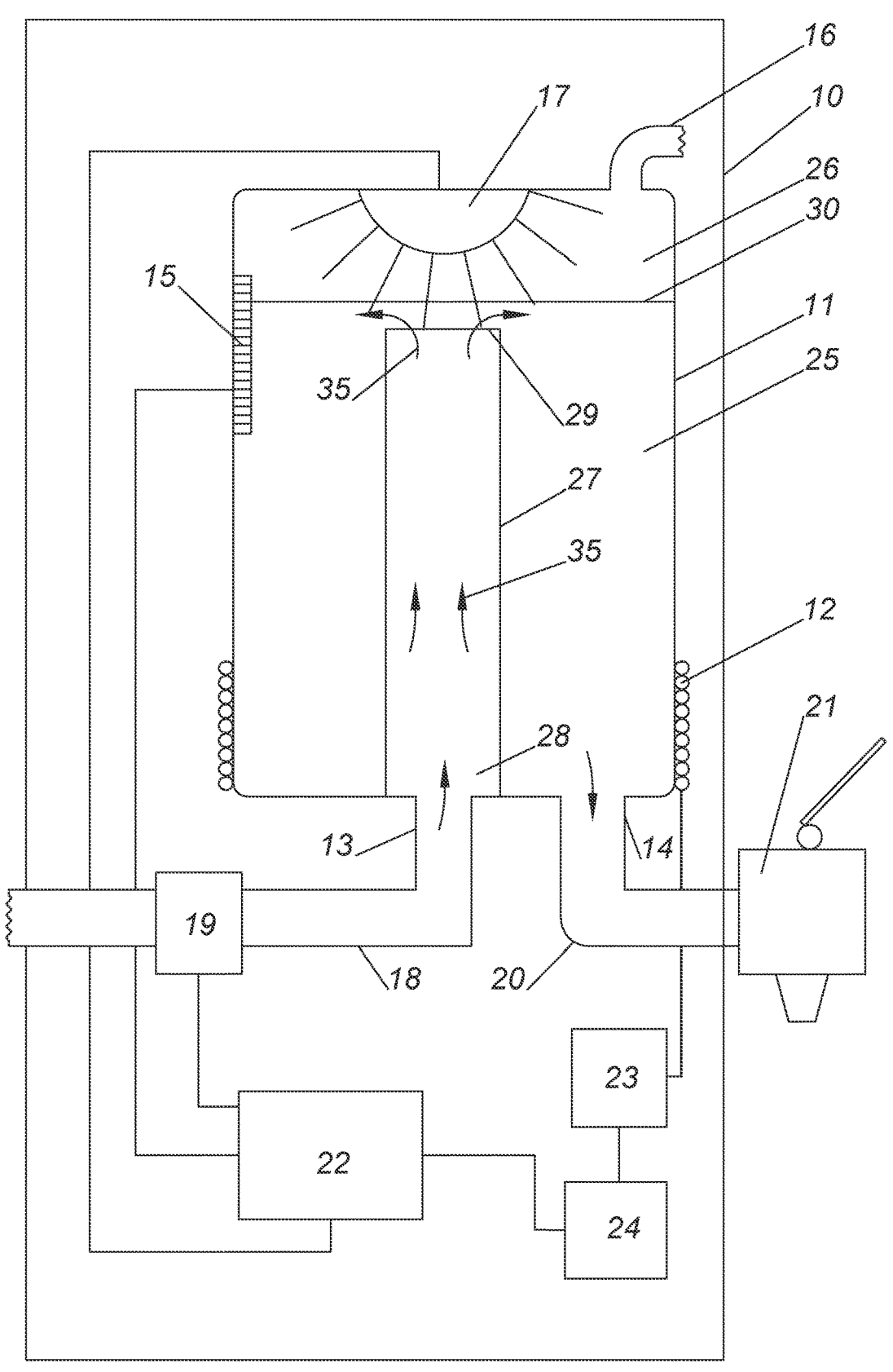
FIG. 1 schematically shows an option of the internal arrangement of the proposed water dispenser.

The water dispenser includes a body 10, and the following installed in the body 10: a cold water tank 11 equipped with a cooling device 12, a water inlet 13, a water outlet 14, a water level sensor 15, an air duct 16 and an ultraviolet (UV) radiation source 17.

The water inlet 13, through the inlet pipe 18 containing an inlet valve 19, is connected to a water source, for example, city water supply. The water outlet 14, through an outlet pipe 20, is connected to an outlet valve 21.

The dispenser also contains a control device 22 ensuring the operation of the dispenser. The control device 22 monitors the water level in the tank 11 using the water level sensor 15 and the inlet valve 19. The control device 22 also controls the operation of the UV radiation source 17, adjusting the UV radiation intensity depending on the operating mode of the dispenser—either treatment of the water entering the tank 11 through the pipe 27, or maintenance of the microbiological purity of water and air in the tank 11 when the water is not dispensed. The dispenser body 10 also contains a compressor 23 connected to the cooling device 12, and a power supply 24 to provide power to the dispenser elements.

The UV radiation source is a semiconductor UV radiation source (UV-C LED) or another UV radiation source, for example, a lamp. One or more adjacent UV emitters can be used as an UV radiation source 17.

The dispenser works as follows. Before starting the operation, the dispenser must be connected to the external water source and the power supply. After turning on the dispenser, the inlet valve 19 opens and the cold water tank 11 is filled with water to the specified level. Simultaneously with the opening of the inlet valve 19, the UV radiation source 17 is switched on and the water entering the tank 11 is disinfected. When the water level in the tank 11 reaches the specified level, the inlet valve 19 closes, the water supply to the tank 11 is stopped. After that, the compressor 23 turns on and the refrigerant flowing through the cooling device 12 cools water in the tank 11. After the temperature of water in the tank 11 reaches the specified value, the dispenser is ready for operation. In standby mode, when water is not dispensed, the UV radiation source 17 can operate at a reduced power or switch off periodically. Water is dispensed to the consumers through the outlet valve 21. When the outlet valve 21 is opened, cooled water flows out of the tank 11 through the pipe 20 and the valve 21 into the consumer's container. In this case, the water level in the tank 11 falls and after the water level falls below the specified threshold, the inlet valve 19 opens, water from the external source enters the tank 11. Water entering the tank 11 through the pipe 27 is disinfected with UV radiation from the UV radiation source 17. When water enters the tank 11, the water level rises and after the water level reaches the specified threshold, the inlet valve 19 closes and the dispenser goes into standby mode.

Placement of the UV radiation source 17 in the air space 26 of the cold water tank 11, unlike using the UV sources submerged in water, simplifies the structure and reduces the pollution of the source with mineral substances dissolved in water, thereby increasing the efficiency of using the UV radiation source 17. Location of the source above the open end 29 of the vertical pipe 27 allows to treat water in pipe 27 entering the tank 11 with UV radiation, and the placement of the open end 29 of the pipe 27 near the water surface 30 causes the water entering the tank 11 for some time to be near the surface 30, i. e., near the UV radiation source 17, which further increases the efficiency of water treatment with UV radiation. In this case, supply of water through the vertical pipe 27 guarantees that all water 35 entering the tank 11 is treated with UV radiation, and excludes the possibility of untreated water entering the tank 11. It is preferable for the emitting surface of the UV source 17 to be wider than the diameter of the vertical pipe 29 so that the pipe 27 vertically located under the UV source 17 does not create a shadow. Placement of the UV radiation source 17 in the air space 26 of the tank 11 also allows to treat with UV radiation the air in the tank 11 and the walls of the tank 11 in the part of the tank occupied by the air space 26.

During operation of the dispenser, the upper open end 29 of the vertical pipe 27 of the water inlet 13 is always near the water surface 30, and water from the pipe 27 evenly flows into the tank 11, and since the temperature of the inflowing water is usually higher than the temperature of the cooled water in the tank 11, the inflowing water for some time, until the temperatures equalize, remains near the water surface, in the area of maximum intensity of UV radiation from the UV radiation source 17 located above the water surface.

Figure 2:
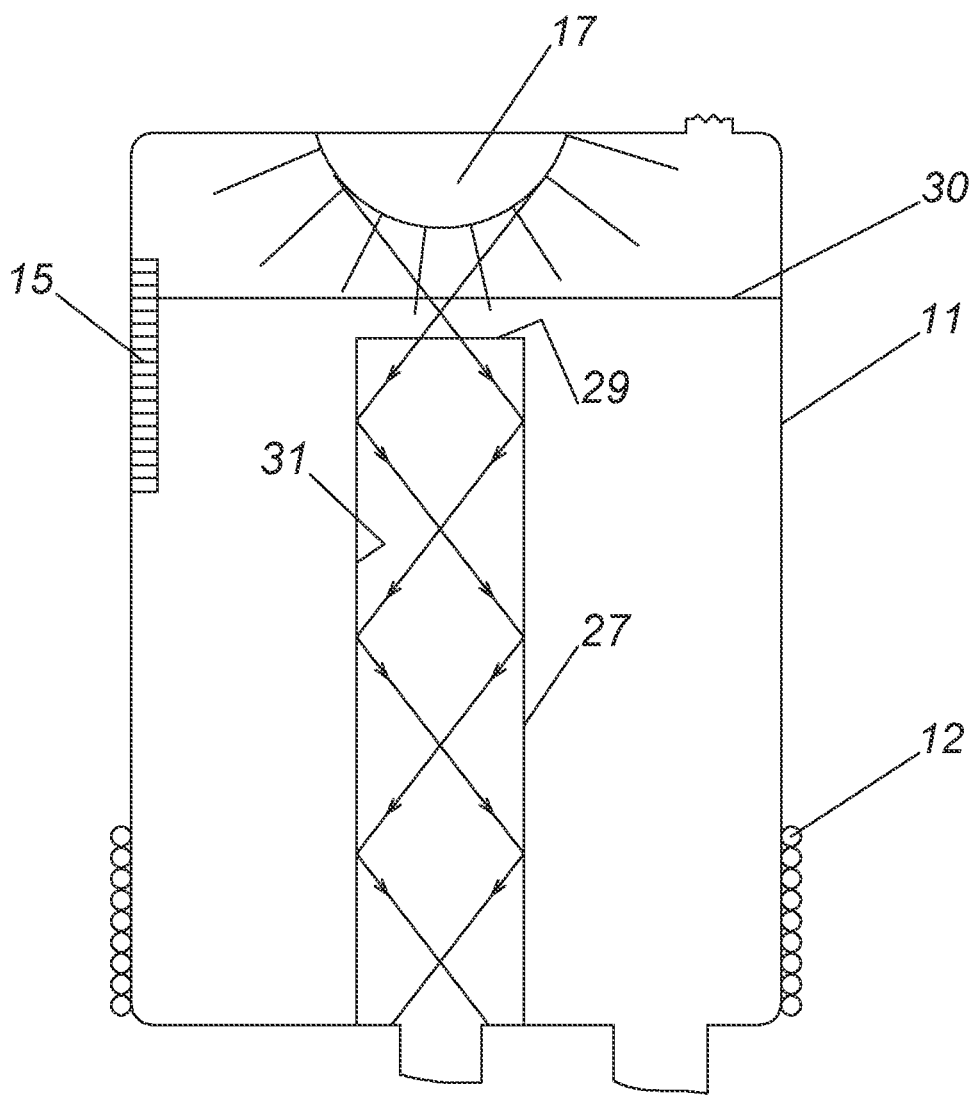
FIG. 2 shows an optional embodiment of the dispenser.

FIG. 2 shows an embodiment of a dispenser in which the inner surface 31 of the vertical pipe 27 is made with high UV range reflectivity. In this case, multiple reflection of UV radiation inside the pipe 27 increases the intensity of UV radiation inside the pipe 27.

Figure 3:
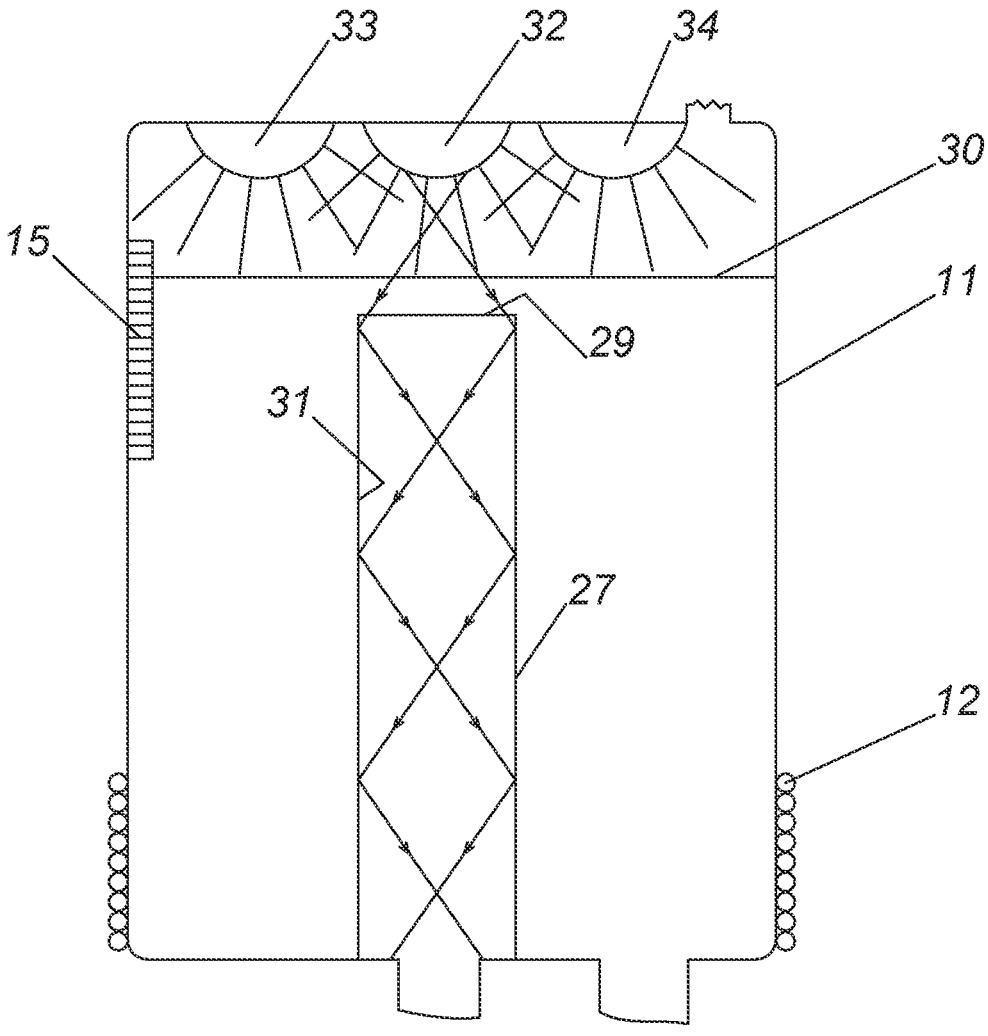
FIG. 3 shows another embodiment of the dispenser.

FIG. 3 shows another embodiment of the dispenser. This embodiment differs from the dispenser in FIG. 1 in that, like the dispenser in FIG. 2, it contains a vertical pipe 27 in which the inner surface 31 is highly reflective in the UV range. Another difference is that in this option the UV radiation source contains three separate sources: the central source 32 located above the open end of the pipe 27 and two additional sources of lower power 33, 34 located on the sides of the central source 32. Each of the sources uses semiconductor UV LEDs (UV-C LED). Use of multiple UV sources allows to optimize the performance of UV sources. For example, the central source 32 can be narrowly directed, so that most of its radiation falls into the inner space of the pipe 27, while the central source can switch on at full power when water enters the tank 11 through the pipe 27 and switch off or operate at a reduced power for the rest of the time. And the side or additional sources 33 and 34 also switch on when water enters the tank 11, and after dispensing continue operating at reduced power or can switch on periodically to maintain the microbiological purity of water in the tank 11 when water is not dispensed to consumers, since the maintenance of microbiological purity of water in the tank requires much lower UV radiation intensity Thanks to the proposed solution, it is possible to purify water 35 entering the cold water tank 11 through the upper open end 29 of the vertical pipe 27 from microbiological contamination, as well as to ensure the microbiological purity of water and air inside the cold water tank 11 during operation of the dispenser, thus ensuring the required microbiological quality of water for the consumers.

LIST OF ITEMS IN DRAWINGS

10 body
11 cold water tank
12 cooling device
13 water inlet
14 water outlet
15 water level sensor
16 air duct
17 UV radiation source
18 inlet pipe
19 inlet valve
20 outlet pipe
21 outlet valve
22 control device
23 compressor
24 power supply
25 lower part, filled with water
26 upper part, air cavity
27 vertical pipe
28 lower end of the vertical pipe
29 upper open end of the vertical pipe
30 water level
31 inner reflective surface of the vertical pipe
32, 33, 34 UV radiation source
35 inflowing water.

The invention claimed is:

1. A drinking water dispenser with a UV disinfection device comprising a body and installed in the body:

an inlet pipe for connecting an external water source, a cold water tank equipped with a cooling device and having a lower part filled with water and an upper part, in which an air cavity is formed, when the cold water tank is filled with water, a water inlet connected to the inlet pipe, and a water outlet connected to an outlet pipe, an outlet valve for dispensing water to consumers, connected to the outlet pipe, and a UV radiation source installed in the cold water tank, wherein the water inlet is made in a form of a vertical pipe, placed in the cold water tank, and having an open upper end and a lower end connected to the inlet pipe; and wherein the UV radiation source is installed in the upper part of the cold water tank above the open upper end of the vertical pipe of the water inlet.

2. The dispenser of claim 1, in which the open upper end of the vertical pipe is located near a water surface in the cold water tank.

3. The dispenser of claim 2, in which a distance from the open upper end of the vertical pipe to the water surface does not exceed 20 mm.

4. The dispenser of claim 1, in which the vertical pipe is cylindrical.

5. The dispenser of claim 4, in which a diameter of the vertical pipe is from 10 mm to 50 mm.

6. The dispenser of claim 1, in which the UV radiation source comprises an LED.

7. The dispenser of claim 6, in which the UV radiation source comprises multiple LEDs.

8. The dispenser of claim 6, in which an inner surface of the vertical pipe is reflective for UV radiation.

9. The dispenser of claim 1, additionally comprising:

a control device, and, connected to the control device, an inlet valve regulating a water supply to the cold water tank, and a water level sensor placed in the cold water tank, wherein the control device is configured to maintain a water level in the cold water tank between specified upper and lower values.

10. The dispenser of claim 9, in which an upper specified water level value is above the open upper end of the vertical pipe of the water inlet and a lower specified water level value is not lower than the open upper end of the vertical pipe of the water inlet.

\* \* \* \* \*